United States Patent [19]

Kudou

[11] 3,860,959

[45] Jan. 14, 1975

[54] MAGNETIC RECORDING AND REPRODUCING APPARATUS WITH HEATED TAPE GUIDE

[75] Inventor: Yoku Kudou, Katano, Japan

[73] Assignee: Matsushita Electric Industrial Co., Ltd., Osaka, Japan

[22] Filed: June 18, 1973

[21] Appl. No.: 370,709

[30] Foreign Application Priority Data

June 19, 1972 Japan .............................. 47-61635
July 3, 1972 Japan .............................. 47-66812

[52] U.S. Cl. .................... 360/84, 360/107, 360/130
[51] Int. Cl. ...................... G11b 15/60, G11b 15/34
[58] Field of Search ........... 179/100.2 C, 100.2 CA, 179/100.2 T; 178/6.6 A; 226/196–199; 360/84, 107, 130

[56] References Cited

UNITED STATES PATENTS 2,848,555 8/1958 Camras ........................ 340/174.1 R
3,207,855 9/1955 Barger ............................ 178/6.6 A

*Primary Examiner*—Alfred H. Eddleman
*Attorney, Agent, or Firm*—Stevens, Davis, Miller & Mosher

[57] ABSTRACT

In a magnetic recording and reproducing apparatus having a tape guide member which is in contact with a running magnetic tape to guide the magnetic tape along a predetermined running path, there is provided heating means for heating the tape guide member at least at the surface of said tape guide member contacting the magnetic tape, whereby moisture existing between the tape guide member and the contacting surface of the magnetic tape is vaporized to reduce frictional resistance therebetween.

5 Claims, 11 Drawing Figures

FIG. I

MAGNETIC RECORDING AND REPRODUCING APPARATUS WITH HEATED TAPE GUIDE

This invention relates to a magnetic recording and reproducing apparatus for recording or reproducing signals through the use of the recording medium of magnetic tape, more particularly to an improvement of the same wherein frictional resistance between a tape guide member for leading the magnetic tape along a predetermined running path and the magnetic tape itself is reduced to ensure stable running of the tape. When taking a rotary head video tape recorder (called VTR hereinafter) for instance, wherein the magnetic tape is wound by a predetermined angle (approximately 180° for a two-heat type) around a cylindrical guide drum having rotary heads therein so as to perform the running of the tape, the contacting area between the tape and the guide drum is usually large. Consequently, when this recorder is used in a very heavy moisture atmosphere with a tape which has been stored in a moist place, or after this recorder is rapidly moved from a low temperature atmosphere to a high temperature one, the increase in humidity between the tape and the guide drum accelerates the frictional resistance, causing such problems that smooth running of the tape is prevented and even when the tape runs, it suffers from plastic deformations.

To investigate such phenomena, a magnetic tape was placed in an atmosphere of approximately 100 percent humidity and its humidity absorption was measured. FIG. 1 shows the result. It will be seen that the graph shown in FIG. 1 that the humidity absorption saturates when the tape is maintained in such an atmosphere for more than 24 hours, and the ultimate moisture absorption reaches up to 31.5 $\mu/cm^3$. Inadvertent application of such a moist tape to a VTR may give difficulties in the running motion of the tape as mentioned above.

For the reduction of moisture between the guide drum and the tape, it is advisable to heat the guide drum in an atmosphere at 20°C. Experimental results under backward tensions of 40 g { standard value for a type I VTR of EIAJ (Electric Industries Association of Japan) Standard} and 70 g (close to the maximum value for the type I VTR of EIAJ Standard) are shown in FIGS. 2 and 3, respectively. As understood from figures, the temperatures rise from the room temperature considerably reduces the frictional coefficient at 20°C and causes at 40°C a further reduction falling to about one half the frictional coefficient at room temperature.

This will be analyzed on the basis of frictional mechanism as follows: moisture absorbed on a surface of the tape and prevailing between the tape surface and the guide drum as well may be vaporized by virture of a temperature rise and thus the frictional resistance can be reduced. It will be anticipated from the foregoing experimental results that intentional heating of the guide drum reduces the frictional force acting between the tape and the guide drum, thereby ensuring stable operation of the running device.

Consequently, in accordance with this invention, there is provided heating means for effecting an intentional heating of the tape guide member which is in contact with the magnetic tape, for example the guide drum, and a principal object of this invention is to provide an improved magnetic recording and reproducing apparatus wherein the conventional difficulties which the running operation of the tape encounters under the condition of high humidity are solved by changing the status of humidity or moisture prevailing in both the tape guide member and the tape, and furthermore, in the light of the fact that a considerable reduction in frictional coefficient between the tape and the guide drum is achieved by the variation in various factors contributive to the frictional mechanism due to the temperature rise of the guide drum, a tape traversing device free from wow and jitter components is realized.

Another object of this invention is to provide an improved magnetic recording and reproducing apparatus capable of effecting a stable running of the tape by rapidly eliminating moisture deposited on a surface of the tape guide member even when the apparatus is operated immediately after its movement to a high temperature atmosphere from a low temperature one.

Still another object of this invention is to provide a concrete structure, especially for use in a rotary head video tape recorder having a complicated tape traversing device, capable of eliminating the increase in frictional coefficient due to moisture between the magnetic tape and the tape guide member.

Still another object of this invention is to provide an improved magnetic recording and reproducing apparatus which is simple in structure and permits stable tape running and excellent recording or reproducing.

Further objects and advantages of this invention will be fully understood from the following detailed description when taken in conjunction with the accompanying drawings, in which.

Figure 4:
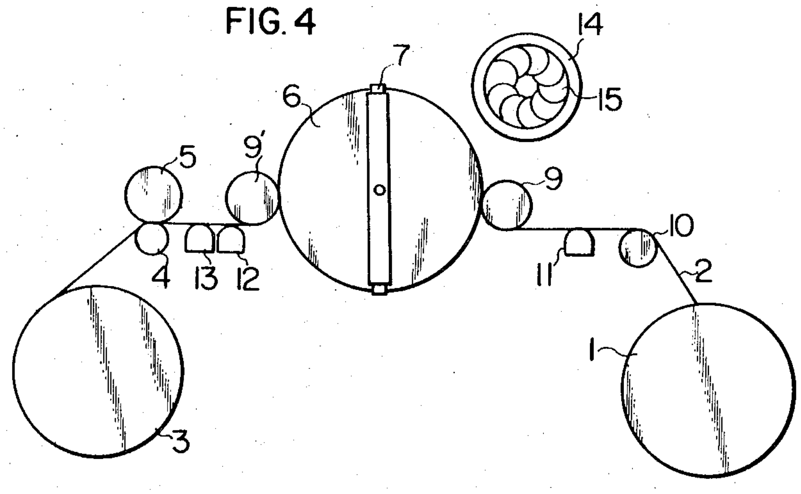
FIG. 4 is a plan view of a rotary head video tape recorder.
Figure 5:
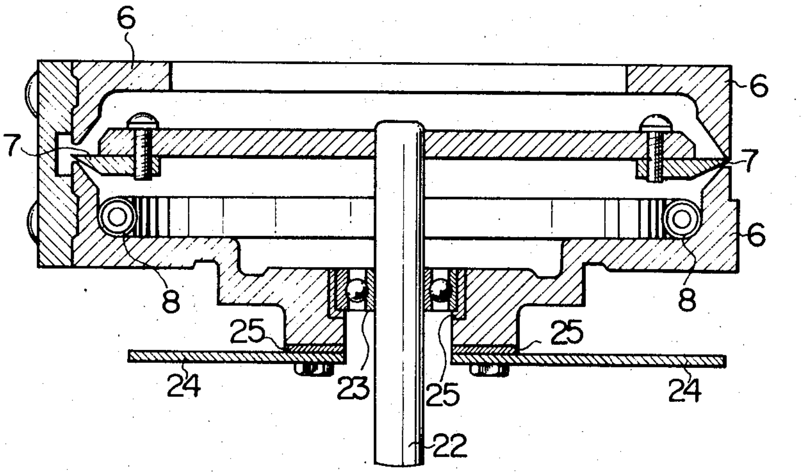
FIGS. 5, 6, 7, 8 and 9 are fragmentary cross-sectional views of different embodiments of this invention, respectively.

Referring now to FIG. 4 which illustrates a general installation of a two-head type VTR, numeral 1 designates a feeding reel wound with a magnetic tape 2, 3 a winding reel, 4 a capstan for driving the tape toward the winding reel in cooperation with a pinch roller 5, and 6 a guide drum having therein rotary heads 7 and heater member 8 such as a sheathed heater or the like as shown in FIG. 5. The heater member 8 is adapted to intentionally heat the guide drum in order to raise the temperature in the guide drum above the ambient temperature. Numerals 9, 9' and 10 designate tape guide posts, 11 a magnetic head eraser, 12 a magnetic head controller, and 13 an audio magnetic head. Numeral 14 designates a motor for driving the rotary head 7, capstan 4 and the like (not shown) through a belt or an idler, whose rotation shaft is provided with a rotatable fan 15 for dissipating heat generated in the motor itself.

In operation, when the tape is running, the heater member 8 is activated and the guide drum 6 is heated so that moisture prevailing between the guide drum and the tape is reduced and also variations in the frictional mechanism with temperature rise decreases frictional resistance, thereby ensuring stable running of the tape.

Figure 6:
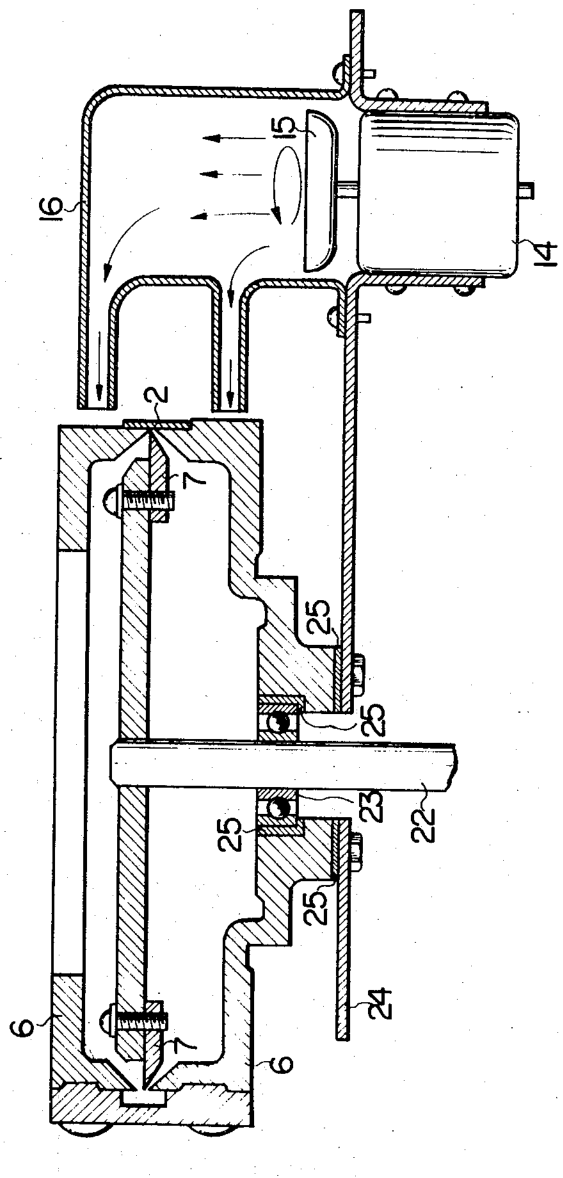

Reference is now made to FIG. 6 showing another embodiment of this invention. In this embodiment, heat generated in the motor for driving the tape or rotary head is dissipated by the rotatable fan 15 and thereafter intentionally delivered through a ventilator 16 to the guide drum 6 in order to effect the heating thereof by means of hot air.

Figure 7:
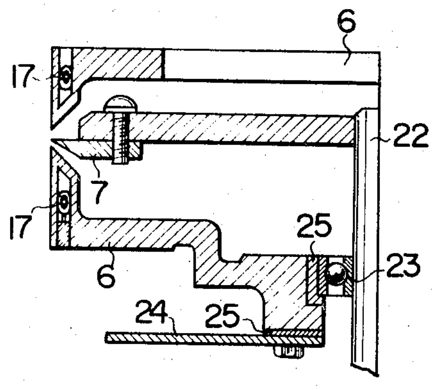

Turning to FIG. 7, a modification is illustrated in which a heater 17 such as a high resistance wire embedded in the wall of the guide drum is provided as the member for heating the guide drum 6.

Figure 8:
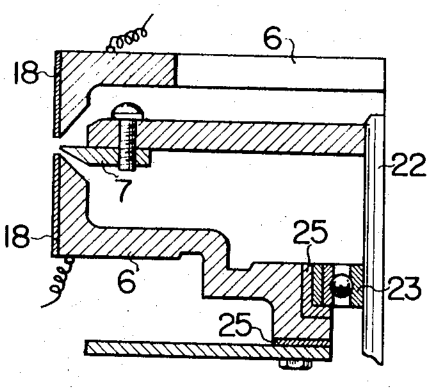
Figure 9:
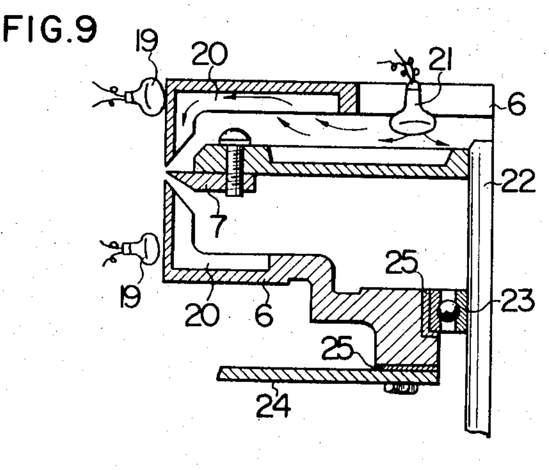

FIG. 8 shows a further modification of the heating member. An electric current is passed through the guide drum itself which in turn generates heat in accordance with its electrical resistance. In this modification, a resistance member 18 may be deposited on the peripheral surface of the guide drum by printing or evaporation and then an electric current may be passed through the resistance member 18. FIG. 9 shows a further modification in which a number of infrared lamps are disposed in the proximity of the guide drum to effect forcible heating. In addition, a hollow 20 may be formed in the guide drum and a lamp 21 illuminates the inner portion of the guide drum to raise the ambient air temperature. With this construction, when the head rotates, a flow of heated air may be forcibly conducted to the hollow 20 of the guide drum. An excellent effect may be expected if a stirrer fan integral with the rotary head 7 is provided.

Figure 1:
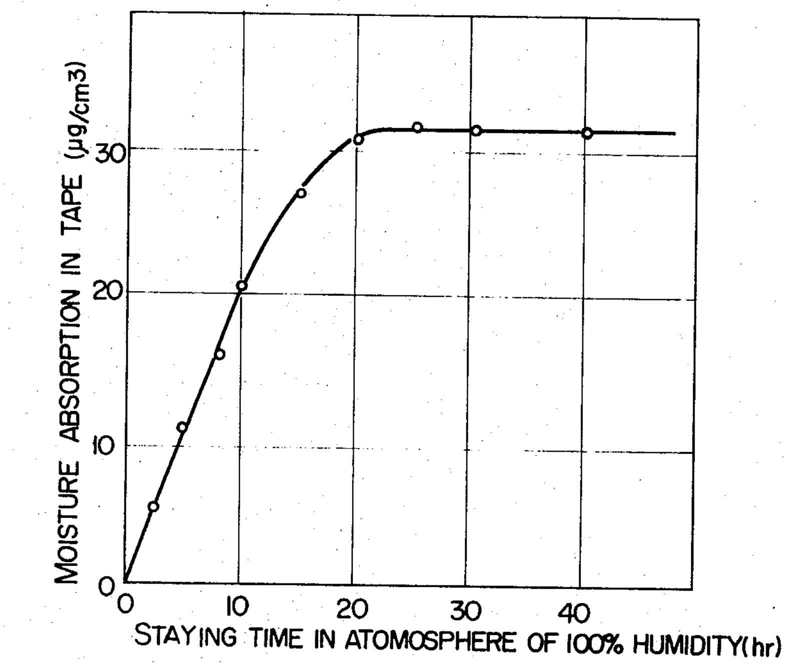
FIG. 1 is a graph depicting the relationship between moisture absorption in the magnetic tape and time.
Figure 2:
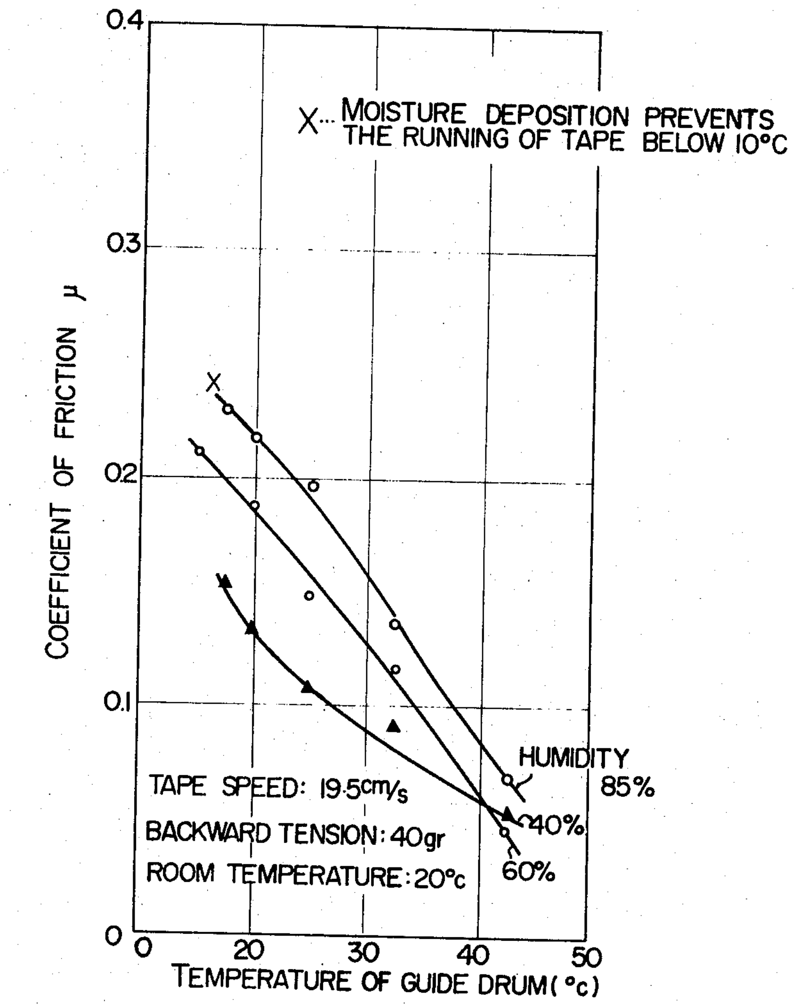
FIGS. 2 and 3 are graphs depicting the relation ship between ambient temperature and a coefficient of friction.
Figure 3:
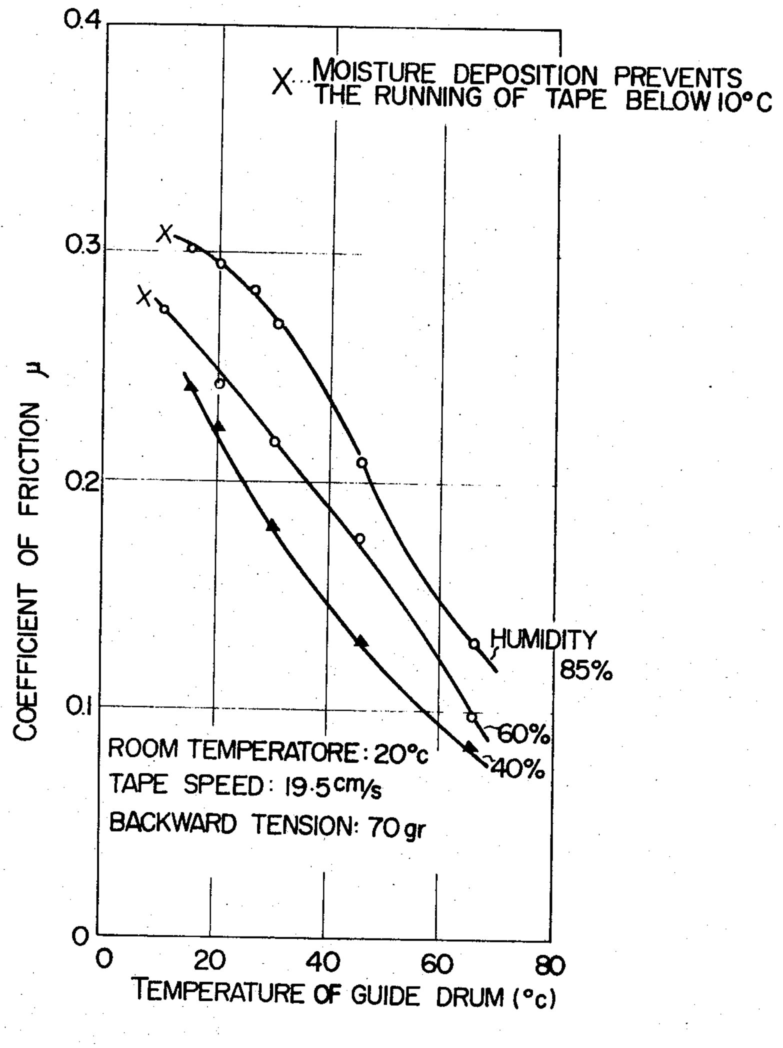

Under forcible heating, if thermal expansion of the diameter of the guide drum prevents exchangeability of other components, the diameter of the guide drum may be designed to be small in consideration of the expected temperature rise. For precise exchangeability, it is advisable to compare the temperature in the surface of the guide drum with the ambient temperature by means of thermistors, for example, so as to maintain the guide drum at a constant temperature. As the constant temperature, a possibly allowable high temperature should be selected in general consideration of the skew and the mechanical strength of tape, with reference to FIGS. 2 and 3 depicting reduction of the frictional coefficient in accordance with the temperature rise in the guide drum.

If the guide drum has a relatively large heat capacity and a desired temperature cannot be obtained immediately after commencement of heating, the apparatus may be so designed that it operates only when the temperature in the guide drum falls in a predetermined temperature or less. (In the event that the tape is adhered to the guide drum owing to moisture and hence the apparatus is operated with the tape without the ability to run, mechanical components of the apparatus on the tape may suffer from damage.)

Another modification may be constituted such that when a main switch is actuated to supply power to a motor or the like, the guide drum is supplied with heat, and thereafter the tape reel is mounted to a given place and then the tape starts to run. In other words, the apparatus gradually shifts to a recording and reproducing operation through steps of preheating.

Generally, when a recording and reproducing apparatus properly stored in a case is operated, the ambient temperature inside the case may rise to some extent owing to heat generated by driving members such as motors and accordingly a temperature rise in the guide drum can be expected. If the temperature in the apparatus can be raised to a desirable degree in this manner, it is advisable for such apparatus that the guide drum be forcibly heated only at the commencement of the running of the tape and heater means for the guide drum be turned off when the ambient temperature inside the case reaches a predetermined value. While in the foregoing embodiments both the upper and lower guide drums are heated, either one of the upper or lower guide drums may be heated.

For the improvement of the heating and cooling response characteristics of the guide drum, between the rotation shaft 22 of heat and bearing 23, in addition, between the guide drum and fixture plate 24 is interposed an adiabatic member 25, as shown in FIGS. 5 to 9. This construction minimizes the heat capacity of the guide drum and enhances the effects brought about by this invention.

While in the foregoing embodiments the heater means is applied to the guide drum of the VTR, it may be disposed in the tape guide members which are in contact with the magnetic tape, for example guide posts, and the same effect as previously described may be expected.

Figure 10:
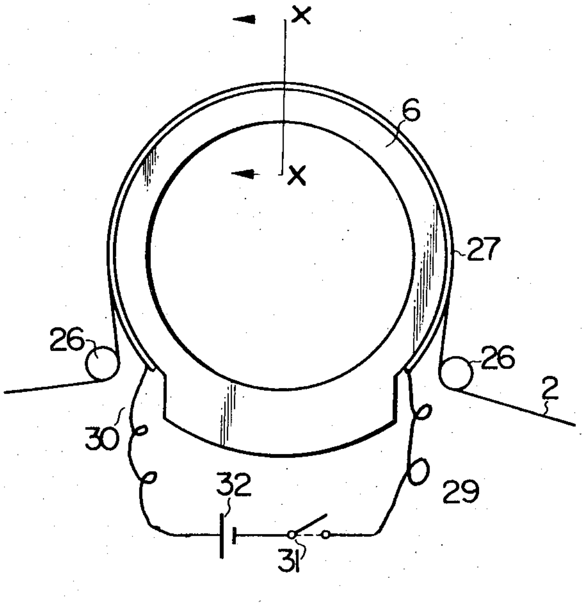
FIG. 10 is a plan view of a further embodiment of this invention.
Figure 11:
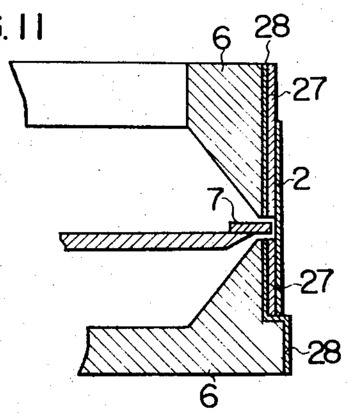
FIG. 11 is a fragmentary cross-sectional view along line X — X in FIG. 10.

Turning now to FIGS. 10 and 11, there is illustrated anothe embodiment of this invention. This embodiment is effective in such a case where the VTR is moved rapidly from a low temperature atmosphere to high temperature one; for example, the VTR is operated for recording outdoors in winter season and then operated for reproducing indoors. In such a case, moisture is deposited on the guide drum and this sometimes prevents normal running of the tape since the tape is forced to run with the result of its adhesion to the guide drum.

In the figures, numeral 6 designates a cylindrical guide drum incorporating two rotary magnetic heads 7 therein and is usually made from aluminum. Numeral 2 designates a magnetic tape which runs being wound around the periphery of the guide drum by approximately 180° by means of guide posts 26, 26. Numeral 27 designates a unique resistive heat generating layer disposed on a portion of the guide drum 6 contacting the magnetic tape 2 through an electrically insulating layer 28 of head aluminate treatment applied on the peripheral surface of the guide drum 6. The resistive heat generating layer 27 is made by application of a hard carbon coating, for example. Both ends of resistive heat generating layer 27 are provided with lead wires 29 and 30 and connected to a power source 32 through a switch 31. Thus, whenever the switch 31 is actuated, an electric current is passed through the resistive heat generating layer and heat is generated.

With this construction, when moisture is deposited on the outer surface of the resistive heat generating layer 27 of the guide drum 6 which outer surface forms a surface along which the tape runs, an electric current is supplied to the resistive heat generating layer 27 whereby the moisture is vaporized immediately.

In this manner, the moisture on the surface of the tape guide along which the tape runs can readily be removed, if needed. With an insulator 28 in the form of a thin layer, after stoppage of the supply of electric current to the resistive heat generating layer 27, the heat generated therein is dissipated through the tape guide drum 6 of relatively large heat capacity and the temperature rapidly falls, thereby preventing unwanted heating of the magnetic tape.

While in this embodiment the insulating layer has been made from alumite and a carbon film has been used as the resistive heat generator, they may be made from other materials; for example, the resistive heat generator may be in the form of a wound stainless foil.

Further it should be understood that many changes and modifications will be obvious to one skilled in the art without departing from the true spirit and scope of the invention as defined in the appended claims.

What I claim is:

1. In a magnetic recording and reproducing apparatus of the helical scan type having magnetic type guide means including a lower drum having a guide surface for guiding a magnetic tape upwardly along its periphery, a shaft rotatably mounted in a concentric relation on the magnetic tape guide surface of said lower drum, an upper drum having a guide surface for guiding the magnetic tape downwardly along its periphery and located in a concentric relation to said lower drum to define a predetermined gap therebetween, and at least one rotary head mounted on said shaft with its leading edge projecting into the gap defined between said upper and lower drums, wherein the magnetic tape travels while it is wrapped around said guide means over at least 180 degrees thereof whereby a slant magnetization pattern can be recorded on the magnetic tape when said rotary head is rotated;

the improvement comprising heating means for heating at least one side of the magnetic tape guide surfaces of said upper and lower drums in order to vaporize water content attracted to contact surfaces between said upper and lower drums and the magnetic tape to reduce friction resistance between said drum and the magnetic tape.

2. A magnetic recording and reproducing apparatus according to claim 1, wherein said heating means comprises a resistive layer provided on the peripheral surface of said tape guide member and means for conducting an electric current to said resistive layer.

3. A magnetic recording and reproducing apparatus of the helical scan type according to claim 1 wherein said heating means comprises a sheath heater accommodated in said drum.

4. A magnetic recording and reproducing apparatus of the helical span type according to claim 1 wherein said heating means comprises a lamp accommodated in said drum.

5. A magnetic recording and reproducing apparatus according to claim 1 further including a base plate for fixing said tape guide means and heat insulating material interposed between said tape guide means and said base plate.

* * * * *